US00RE40217E

(19) United States
(12) Reissued Patent
Masters et al.

(10) Patent Number: US RE40,217 E
(45) Date of Reissued Patent: Apr. 8, 2008

(54) SYSTEM FOR SECURING COMPOSITE GRATINGS TO STRUCTURAL MEMBERS

(75) Inventors: Rodney H. Masters, Houston, TX (US); Michael T. Haas, Houston, TX (US)

(73) Assignee: Advanced Industrial & Marine Services, Houston, TX (US)

(21) Appl. No.: 09/481,153

(22) Filed: Jan. 12, 2000

Related U.S. Patent Documents

Reissue of:

(64) Patent No.: 5,732,523
Issued: Mar. 31, 1998
Appl. No.: 08/654,730
Filed: May 29, 1996

(51) Int. Cl.
*E04C 2/42* (2006.01)
*E04B 1/38* (2006.01)

(52) U.S. Cl. ..... 52/698; 52/460; 52/507; 52/584.1; 52/656.8; 52/664; 52/712; 52/764; 52/775; 52/777

(58) Field of Classification Search ..... 52/698, 52/460, 507, 581, 584.1, 656.8, 656.3, 664, 52/712, 764, 775, 777; 403/364; 292/256
See application file for complete search history.

(56) References Cited

U.S. PATENT DOCUMENTS

| | | | |
|---|---|---|---|
| 1,567,446 | A | 12/1925 | McClure |
| 1,707,533 | A | 4/1929 | Nagin |
| 2,075,588 | A | 3/1937 | Meyers |
| 2,705,550 | A | 4/1955 | Joseph |
| 3,309,119 | A | 3/1967 | Phillips |
| 3,367,078 | A | 2/1968 | Thompson, Jr. |
| 3,742,671 | A | 7/1973 | Ellis |
| 4,185,435 | A | 1/1980 | Schiffers, Jr. |
| 4,221,038 | A | 9/1980 | Singer et al. |
| 5,118,147 | A | 6/1992 | Correll |
| 5,291,714 | A | 3/1994 | Wright et al. |

OTHER PUBLICATIONS

AIMS International Inc.; AIMS Spec. FG–001, Sketch SK–003.
AIMS International Inc.; AIMS Spec. FG–001, Sketch SK–008.
AIMS International Inc.; Drawings: Section, Option I, Option II.
AIMS International Inc.; Fiberglass Grating System Attachment Detail; Dwg. No. 853–102; Jun. 8, 1992.
AIMS International Inc.; Sheet 2 of 3; Dec. 6, 1994.
AIMS International Inc.; Fiberglass Grating at Boatlanding and Details; Dwg. No. 772–102; Feb. 6, 1990.
AIMS International Inc.; Step, Ladder & Cage Detail; Dwg. No.D625–S–215; Mar. 2, 1994.
AIMS International Inc.; Sump Access Platform & Intermed. Landing.Grtg. Attachment & Det.; Dwg. No. 2005A; Sep. 24, 1989.
Notes by R. Masters based on U.S. Appl. No. 08/654,730.
Hand written pages describing prior art in the field of installing grating to upper structures.*

* cited by examiner

*Primary Examiner*—Winnie Yip
(74) *Attorney, Agent, or Firm*—Fulbright & Jaworski, LLP

(57) ABSTRACT

A fastener system for securing a grating to an underlying structural support member when the grating experiences extremely high wave pressures. The fastening system includes elongated generally L-shaped connectors for fastening the longitudinal edges of grating sheets to structural members and plate fasteners in a wave zone area of the platform. The plate fasteners have a top plate for mounting on an upper surface of the grating sheets, a bottom plate for attaching to the structural members in a laterally extending direction for supporting the grating sheet and bolt assemblies for clamping the top and bottom plates together in order to secure the grating sheets to the structural members. A combination of the elongated L-shaped connectors and the plate fasteners provide fastening support for the gratings sheets so as to resist vertical and horizontal wave pressures when secured to the supporting members.

11 Claims, 4 Drawing Sheets

SYSTEM FOR SECURING COMPOSITE GRATINGS TO STRUCTURAL MEMBERS

Matter enclosed in heavy brackets [ ] appears in the original patent but forms no part of this reissue specification; matter printed in italics indicates the additions made by reissue.

SPECIFICATION

1. Field of the Invention

The present invention relates to a fastening system for securing a grating to a structural support member, and more particularly, to fasteners for securing fiberglass gratings to a walkway or landing in the wave zone area of an offshore platform or other similar platforms located in chemical plants, docks, refineries and elsewhere, where the gratings are subjected to wave pressures exerted by storm wave action or other hydraulic forces.

2. Background of the Invention

Grating sheets or panels are used in a variety of applications such as in walkways on offshore platforms. Due to its structural strength, a metallic grating has typically been used to form the walking surface of a walkway. Metallic gratings are typically secured to its supporting steel members by tack-welding the grating to the supporting steel members at designated intervals. These "tack-welds," or the weld affected areas require touch-up painting and it is these touch-up areas that generally break down first, creating a corrosion cell. However, due to this corrosion caused by deterioration of the paint system, a metallic grating is often not desirable. Although the metallic grating is typically galvanized or painted, the paint eventually wears, chips or fades or otherwise succumbs to corrosion primarily at the weld-affected areas. Fabricating the grating out of a non-corrosive metal, such as stainless steel, is expensive and impractical for a large walkway.

For providing support, a typical walkway has longitudinal structural support members, most often pipe members, extending along the edge of the walkway and transverse members extending between and reinforcing the longitudinal structural support members. The grating is placed on top of these structural support members. As previously stated, metallic gratings are typically secured to the structural support members by tack-welding the grating to the transverse supports at every 3rd or 4th support and at 6 inch intervals along the longitudinal members.

Currently, the solution to the above-discussed corrosion problem typically involves replacing the metallic grating with grating formed from a fiberglass material which is resistant to corrosion and furnishes firm support for the walkway. However, the fiberglass grating introduces additional problems, as the above-described system for mounting the metallic grating does not work when fiberglass grating is used, as the fiberglass grating cannot be welded. Placing the fiberglass grating on top of the structural support pipe members and securing it in place with clips, such as described in U.S. Pat. No. 5,118,147, does not firmly secure the grating in the offshore platform environment subjected to severe wave action. The circular motion of waves that constantly wash through the grating subjects it to multidirectional forces that eventually displaces the grating from the clips and the grating washes out.

Other prior art includes the use of flexible bands to secure the fiberglass grating to the underlying crossbar support members. However, the use of flexible bands require a worker to go beneath the grating to secure the grating to the supporting structure. Working beneath the grating can be quite hazardous in an offshore platform environment. Also, this system secures the grating vertically but not laterally and with constant wave action, lateral movement of the grating occurs which produces a "saw cutting" phenomenon that continues until the flexible bands saw through the grating.

It would be desirable to have a system for securing the fiberglass gratings to the support members of the platform that would not only be corrosion resistant but would also be able to withstand the forces of the waves in the wave-zone areas of the platform. The "wave-zone" is the portion of an offshore structure that, in the event of a hurricane, typhoon or any other violent storm, could be under water as a wave passes through the platform. In a typical platform in the Gulf of Mexico the elevation of this portion of the platform could be as high as 40 to 50 feet above the mean low water level. When large waves pass through the platform, they exert extremely high horizontal and vertical pressures on the platform structure and any appurtenances such as the grating system.

SUMMARY OF THE INVENTION

The present invention relates to a new and improved fastener system for securing fiberglass grating to an underlying structural support member in the wave-zone of an offshore platform or any other hydraulic zone area. In one embodiment, the fastener system includes an elongated generally L-shaped connector having an upper plate section generally rectangular in shape for mounting on the upper surface of the grating sheet. A downwardly extending sidewall is formed integrally with the plate section and extends along a longitudinal edge of the grating sheet. The sidewall is secured to the structural member. Optionally, the plate section can include a downwardly extending series of teeth formed integrally with the plate section and extending parallel to the sidewall for insertion in the openings between the bars of the grating sheet.

Another embodiment is a plate fastener that includes a top plate for mounting on the upper surface of the grating sheet and a bottom plate having a slotted or circular opening. The bottom plate is sized and shaped for attaching to the structural member in a laterally extending direction for supporting the grating sheet. A bolt assembly clamps the top plate and bottom plate together in order to secure the grating sheet to the structural members so as to prevent displacement of the grating sheet from the structural members by extreme wave action. The top plate can include a cylindrical standoff secured to the lower surface of the top plate for placement between adjacent grating bars with the standoff having a bore and an opening sized and shaped to receive a portion of the bolt. The bottom plate can include a channel secured to its lower surface and aligned with the slot opening of the bottom plate. The channel houses a movable nut that mates with the bolt. Alternatively, the top plate can have a downwardly extending bolt attached to its lower surface for insertion between adjacent grating bars and through the slot opening of the bottom plate.

In another embodiment of the plate fastener, the top plate has a centrally located depression with a centrally located circular hole. The bottom plate has an upwardly extending bolt attached to its upper surface for insertion between adjacent grating bars and through the circular hole of the top plate. A nut mates with the bolt and clamps the top and bottom plates together in order to secure the grating sheets to the structural members so as to prevent displacement of the grating sheet from the structural members by extreme wave action.

DETAILED DESCRIPTION OF PREFERRED EMBODIMENT

Figure 1:
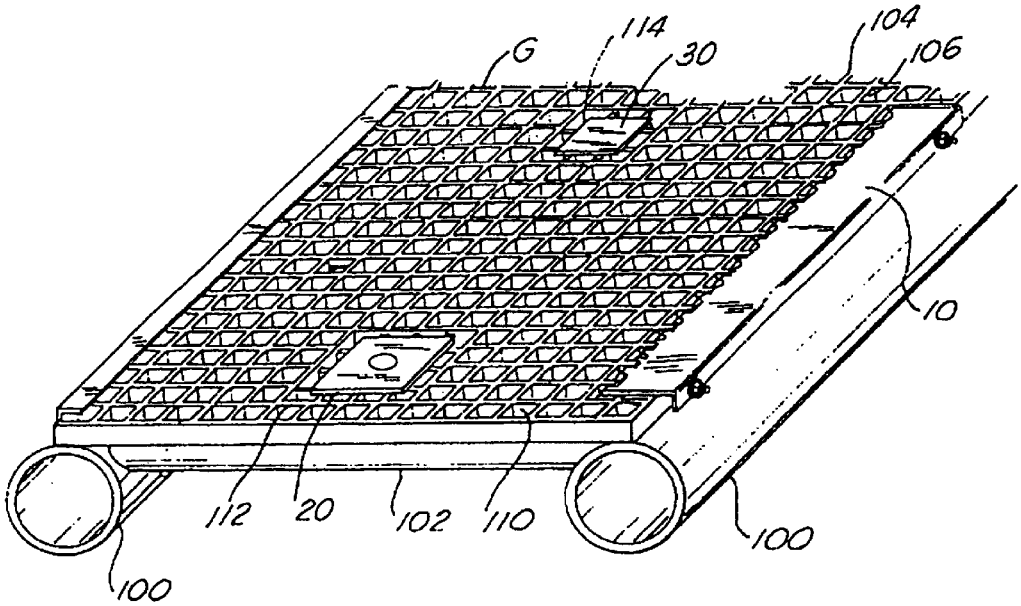
FIG. 1 is a perspective view of a section of an offshore platform or other walkway illustrating an embodiment of the present invention.

Now referring to FIG. 1, a portion of a walkway of an offshore platform is shown having a grating G supported by two underlying parallel, spaced structural support members 100 located and extending along each edge of the walkway. The walkway is reinforced by structural transverse members 102 which are welded to and extend between the structural support members 100. Typically, these transverse members 102 are framed in to be flush on top with the support members 100.

The grating G forming the walkway is formed from fiberglass in order to inhibit corrosion of the floor of the walkway by salt water. However, as can be appreciated, the grating G could also be made of metal or any other structural material. The grating G has bars 104 extending parallel to the structural support members 100 and crossbars 106 extending perpendicularly to the structural support members 100. Thus, bars 104 and 106 form a uniform grid pattern having preferably uniform adjacent square or rectangular grid openings 110.

An edge fastener 10 of this invention secures the edge of the grating G to one of the structural support members 100 and plate fasteners 20, 30 and 40 secure the grating G to the transverse members 102. In a preferred embodiment, all of the fasteners 10, 20, 30 and 40 are formed of stainless steel or any other corrosion resistant material. Depending upon the installment situation, the edge fasteners 10 can be used either alone or in combination with the plate fasteners 20, 30 and/or 40. Likewise, only the plate fasteners 20, 30 and/or 40 can be used to secure the grating G to the underline support structures.

Due to their placement in the flow of traffic across the walkway, the plate fasteners 20, 30 and 40 are preferably seated within recessed areas 114 and 112, respectively, of the grating G. Because the grating G is formed from fiberglass, recessed areas 112 and 114 can readily be formed during installation of the walkway. Recessed areas 112 and 114 can be formed by any number of different methods which use, for example, a router, a disc sander or a circular saw with an abrasive blade (masonry).

Figure 2:
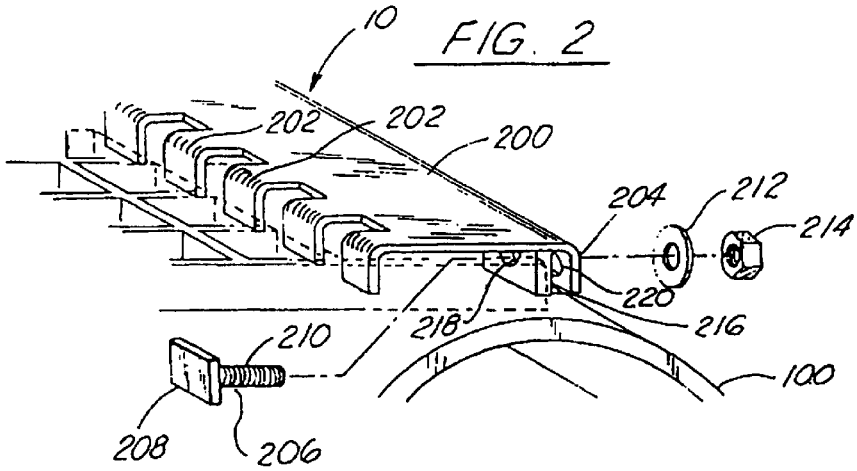
FIG. 2 is a perspective view of the edge fastener of the present invention illustrated in FIG. 1.

Referring to FIG. 2, the edge fastener 10 is an elongated, generally L-shaped member that attaches to both the edge of the grating G and the support member 100. The edge fastener 10 includes a rectangular upper plate section 200 with a rectangular sidewall 204 integral with the plate section 200. The sidewall 204 extends downwardly from the plate section 200 along the edge of the grating G parallel to the support members 100. The height of the sidewall 204 is approximately equal to or slightly greater than the thickness of the grating G in a preferred embodiment.

The plate section 200 laterally extends over the grating G from the edge of the grating G at preferably a distance greater than the spacing of one length of bar 104. In a preferred embodiment, a plurality of downwardly extending teeth or claws 202 can be located at the inner edge of the plate section 200, opposite the sidewall 204. In a preferred embodiment, the teeth or claws 202 are spaced such that each one of the claws 202 extends downwardly inside one grid opening 110 when the plate section 200 extends over the grating G. The edge fastener 10 securely clamps the grating G to the structural member 100 regardless of the direction of the wave forces. The combination of the plate section 200, the sidewall 204 and the row of extending claws 202 forms a generally U-shaped edge fastener 10. The claws 202 can be machined or welded or otherwise attached to the longitudinal plate section 200.

Sidewall 204 is secured to the structural support member 100 through one or more rectangular tabs 216 which are welded to the supporting surface of the support members 100. Each tab 216 is approximately the same height as the thickness of the grating G and includes a hole 218 through which bolts 206 secure the edge fastener 10 to the tab 216. For each tab 216, the sidewall 204 has an associated horizontal hole or slot 220 for receiving the bolt 206 therethrough and to facilitate positioning the edge fastener 10 along the support member 100.

To secure the grating G to the support member 100, each tab 216 is first welded to the upper surface of the structural support member 100 so as to extend upwardly and parallel to the axis of the support member 100 and edge of the grating G. The bolts 206 are then positioned such that each bolt 206 extends through the hole 218 of the tab 216 and the grating G is then set in place. Edge fastener 10 is placed over each corresponding tab 216 and protruding bolts 206 such that the surface of the sidewall 204 closest to the grating G abuts the tab 216. The bolts 206 thus will extend through the corresponding horizontal slot 220 of the sidewall 204.

The edge fastener 10 is adjusted longitudinally along support member 100 so that each one of the claws 202 extends downwardly inside one grid opening 110. Bolts 206 are then tightened in place. Each bolt 206 has a rectangular head 208 which contacts the upper surface of the support member 100 so the bolt 206 does not turn when a threaded nut 214 is mated with a screw thread 210 of the bolt 206. A disk-shaped washer 212 is located between the nut 214 and the adjacent surface of the sidewall 204. Utilizing the fastener system 10 of FIGS. 1–2, the edge fasteners 10 extend along each of the support members 100 and grip the edges of the grating G along the length of the generally rectangular edge fastener 10. As can be appreciated, a worker can install the edge fastener 10 to the grating G without having to work beneath the support members 100 or the grating G.

Figure 3:
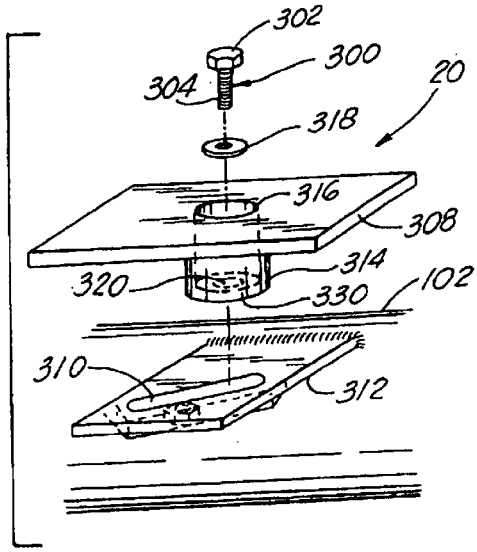
FIG. 3 is a perspective view of another embodiment of a fastener of the present invention for use with a transverse or longitudinal structural support.

Another embodiment of the fastener system of the present invention is illustrated in FIG. 3. Plate fastener 20 includes a top plate 308 and a bottom plate 312. Top plate 308 can be either rectangular or square in shape and has a centrally located circular hole 316. The circular hole 316 is of sufficient diameter for the head 302 of a bolt 300 to pass therethrough with sufficient room to insert an installation tool such as a sock wrench into the circular hole 316. A cylindrical standoff or nipple 314 is welded to the underlying surface of the top plate 308 in a coaxial position with the center of the hole 316. To the end of the standoff 314, farthest from the top plate 308, is welded or otherwise formed thereto, a bottom plate 330. Plate 330 has a circular opening 320 sized to keep the head 302 of the bolt 300 and/or washer 318 from passing therethrough. The bottom plate 312 can be either rectangular or square in shape and is welded to the transverse member 102 such that the bottom plate 312 extends laterally from the top surface of the transverse member 102 and furnishes support for the grating G as well as providing for the attachment of the grating G to the member 102. It can be appreciated that the bottom plate 312 does not necessarily provide support for the grating G.

The plate fastener 20 is installed by welding the bottom plate 312 to the transverse member 102 such that the upper surface of plate 312 is generally parallel to the lower surface of the grating G. Plate 312 does not necessarily have to be flush with the top of the transverse member 102. The grating G is then placed on top of the bottom plate 312. If preferred, the recessed area 112 of the grating G can be formed in the upper surface of the grating G at this point in the installation.

The standoff 314 of the upper plate member 308 extends through one of the openings 110 of the grating G so that the attached upper plate member 308 is seated within the recessed area 112 of the grating G and is in contact with the upper surface of the bottom plate 312. The bottom plate 312 includes a slot opening 310 through which the bolt 300 extends. The slot opening 310 is diagonally positioned relative to the grid of the grating G and/or the transverse member 102 so as to facilitate the positioning of the fastener 20 within the opening 110. During installation, it may be necessary to remove one of the bars 104 and/or a portion of two or more of the cross bars 106 of the grating G in order to permit the standoff 314 of the plate 308 to be placed in alignment over the slot opening 310 of the bottom plate 312.

To secure the grating G to the plate fastener 20, bolt 300 is extended through a washer 318, opening 320 of the upper plate 308, the slot opening 310 of the bottom plate 312 and into a threaded nut 400. The threaded nut 400 is placed below the bottom plate 312 for mating with the screw threads 304 of the bolt 300 and upon tightening secures the grating G in place upon the transverse members 102.

Figure 4A:
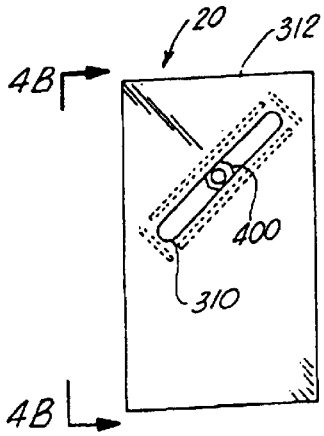
FIG. 4A is a top plan view of the flange member of the fastener shown in FIG. 3.
Figure 4B:
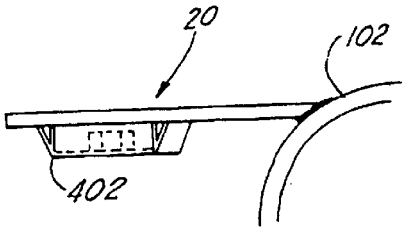
FIG. 4B is a left side plan view of the flange member shown in FIGS. 3 and 4A.

Primarily for safety concerns on an offshore platform, as discussed above, it is desirable to secure the grating G to the platform from the top of the platform rather than having the worker install the grating G from below. In a preferred embodiment, the plate fastener 20 can include a rectangular channel 402 secured to the underlying surface of the bottom plate 312 and aligned with the slot opening 310, as shown in FIGS. 4A and 4B. Channel 402 houses and serves as a guide for the threaded nut 400 and is sized and shaped to allow the nut 400 to move freely along the length of the rectangular channel 402 but prevent it from rotating within the channel 402. Channel 402 extends along the entire length of the slot opening 310 and its width is approximately equal to the outer diameter of the nut 400. A portion of the bottom of the channel 402, like its top, is open for allowing the bolt 300 to extend therethrough.

Thus, when the plate fastener 20 with the channel 402 is used, a worker does not have to go beneath the grating G in order to secure it to the transverse member 102. Instead, the nut 400 housed within the channel 402 can be aligned with the bolt 300 by such means as a stiff wire. After alignment, the bolt 300 is threaded into the nut 400 and through the bottom of the channel 402 and tightened in place.

Figure 6:
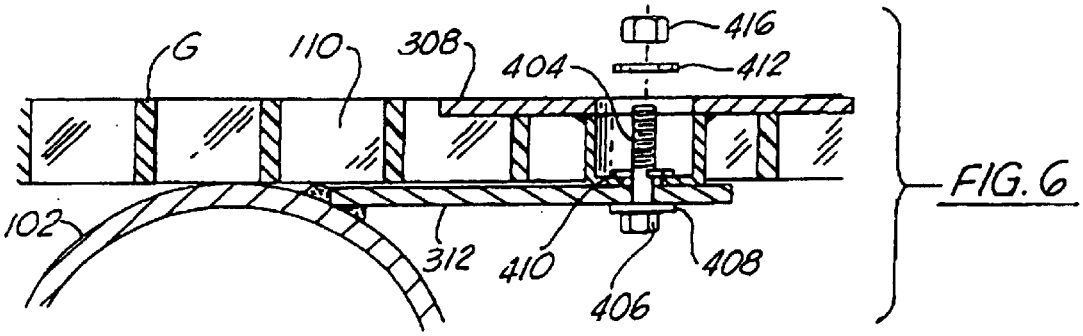
FIG. 6 is a side plan view of another embodiment of a fastener of the present invention.
Figure 7A:
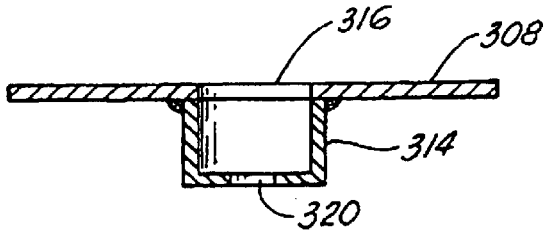
FIG. 7A is a side plan view of the plate member of the fastener illustrated in FIGS. 3 and 6.
Figure 7B:
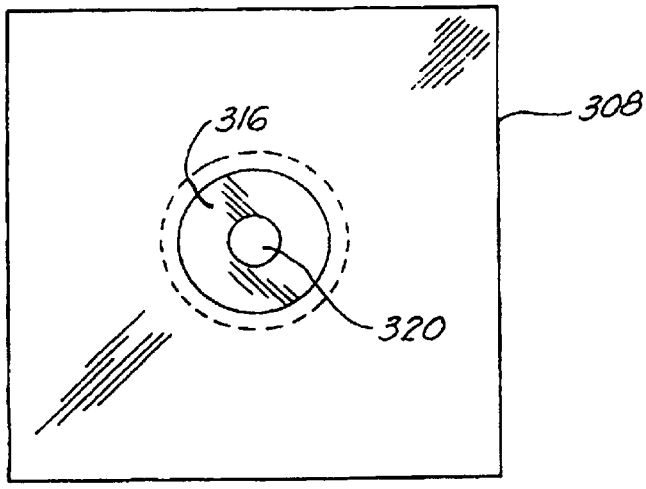
FIG. 7B is a top plan view of the plate member of FIGS. 3 and 6 and 7A.

Alternatively, a different bolting arrangement can be used as illustrated in FIGS. 6, 7A and 7B. Instead of inserting the bolt 300 from the top of the plate 308, a bolt 404 having an enlarged head 406 is inserted from the underside of the bottom plate 312. Prior to inserting the bolt 404 through the plate 312, a washer 408 is placed on the bolt 404 with the washer 408 being sized and shaped to rest upon the underside of the bolt head 406. The bolt 404 is placed through the slot 310 of the plate 312 and through the opening 320 of the standoff 314 so as to extend into the standoff 314. A retainer clip or star clip 410 is placed on the bolt 404 in order to hold the bolt 404 in place within the standoff 314. The plate fastener 20 is the secured by placing a second washer 412 over the retainer clip 410 and tightening a nut 416 over the entire assembly. When this bolting arrangement is used, the grating G can be installed from the top surface of the grating G without the worker having to work beneath the support members 100 or the grating G.

Figure 5:
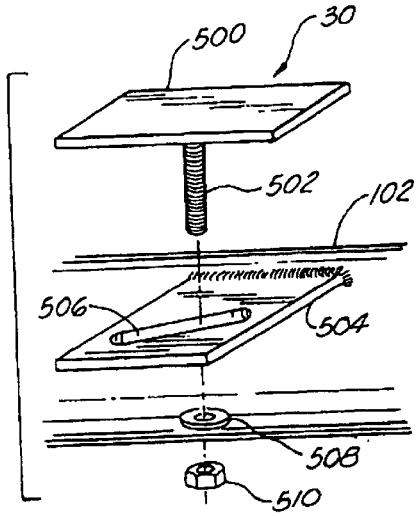
FIG. 5 is a perspective view of another embodiment of a fastener of the present invention.

Another embodiment of the fastener system of the present invention is illustrated in FIG. 5. Plate fastener 30 can also be used to attach the grating G to either the support member 100 or the transverse support 102. However, when plate fastener 30 is used the worker installing the grating G will need to work beneath the grating G. Plate fastener 30 includes a top plate 500, that can be circular, rectangular of square in shape, with a centrally placed threaded bolt 502 attached substantially perpendicular to the underside of plate 500. Bolt 502 is secured to the underside of plate 500 by welding or other suitable means.

A circular, rectangular or square bottom plate 504, basically identical or similar to bottom plate 312, is welded to the support member 100 or the transverse member 102 such that the bottom plate 504 extends laterally from the top surface of the support member 100 or the transverse member 102 and furnishes support for the grating G. Plate 312 does not necessarily have to be flush with the top of the transverse member 102. Bottom plate 504 includes a slot opening 506 through which the threaded bolt 502 extends. Slot opening 506 is positioned diagonally relative to the transverse member 102 in order to facilitate positioning of the plate fastener 30 within the openings 110 of the grating G.

In order to fasten the grating G to the support member 100 or the transverse member 102, the bottom plate 504 is first welded to either the support member 100 or the transverse member 102 such that the upper surface of plate 504 is parallel to the bottom surface of the grating G. The grating G is then placed on the upper surface of the bottom plate 504. If preferred, the recessed area 114 of the grating G can be formed in the upper surface of the grating G. The top plate 500 with bolt 502 is then placed on top of the grating G by extending the bolt 502 through one grid opening 110 of the grating G, through the slot opening 506 of plate 504. Top plate 500 is then secured with a washer 508 and a threaded nut 510 which mates with the screw threads of the bolt 502.

In order to install the washer 508 and the threaded nut 510, a worker must get underneath the support member 100 or the transverse member 102 and the grating G of the walkway. If the washer 508 and the nut 510 is welded to the underside of the bottom plate 504, then the plate fastener 30 could be installed from the top of the walkway. If the nut 510 is welded to the plate 504, it may be necessary to re-thread the bolt 502, if its threads are warped by the heat of the welding.

Figure 8:
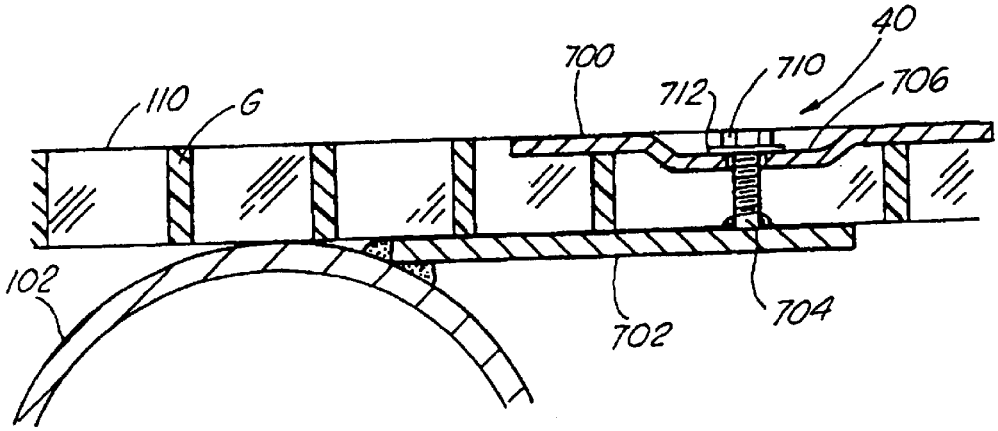
FIG. 8 is a side plan view of another embodiment of a fastener of the present invention.
Figure 9:
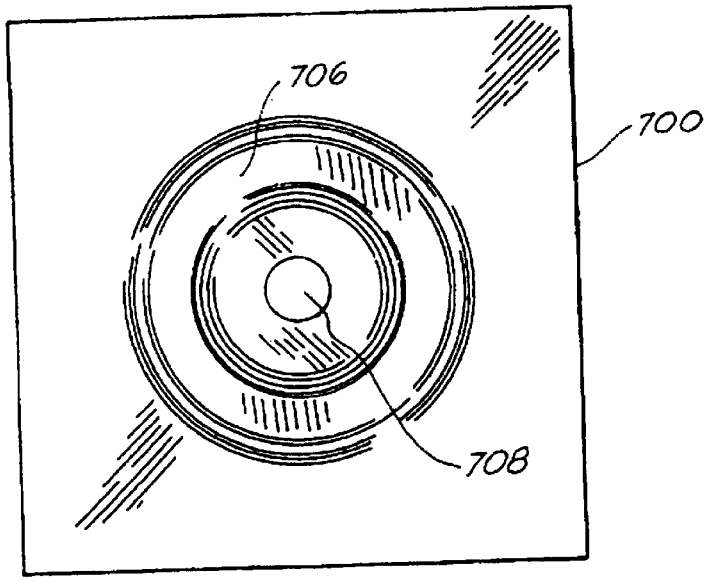
FIG. 9 is a top plan view of the plate member of the fastener of FIG. 8.

Another alternate embodiment of the fastener system of the present invention is shown in FIGS. 8 and 9. Plate fastener 40 includes a top plate 700 and a bottom plate 702. Top plate 700 can be either rectangular or square in shape and includes a centrally placed generally circular depression 706. A circular hole 708 is in the bottom of the depression 706 and is of sufficient diameter for a bolt 704 to pass therethrough. The top plate 700 can be manufactured by press-stamping the depression 706 into the plate 700 or any other suitable manufacturing technique can be used. The bottom plate 702 includes a centrally placed threaded bolt 704 attached substantially perpendicular to the upper surface of plate 702. Bolt 704 is secured to the upper surface of plate 702 by welding or other suitable means. The bottom plate 702 is installed in the same manner as plate 312 of the plate fastener 20.

To secure the grating G to the plate fastener 40, the top plate 700 is positioned on the grating G with the depression 706 being placed within an opening 110 of the grating G so that bolt 704 will extend up through the opening 708 at the bottom of the depression 706. A washer 712 and threaded nut 710 are placed over the bolt 704, mating the threads of the bolt 704 with the threaded nut 710. When the nut 710 is tightened it secures the grating G in place upon the support members 100 or the transverse members 102. The depression 706 of the plate 700 allows the nut 710 and washer 712 to be installed below the top surface of the grating G while providing for installation of the plate fastener 40 from the top of the grating G.

The edge fastener 10 of the present invention is generally used when a long continuous walkway is installed in which the grating panels or sheets are laid end-to-end, for example in a walkway with dimensions of 4 feet wide by 40 feet long. Four grating panels of 4 feet by 10 feet would be laid end-to-end on top of the walkway support members. The edge fastener 10 would be installed along both sides of the walkway. In many instances, the plate fasteners 20, 30 or 40 are also used in conjunction with the edge fasteners 10. This is a preferred method of securing the fiberglass grating to the underlying support members in the wave zone areas of an offshore platform or other similar platforms where the gratings are subjected to wave pressures exerted by strong wave action of other hydraulic forces.

On offshore platforms large areas of grating are used to form a landing or base of a stair in which the grating panels are placed side-by-side rather than end-to-end. In this situation, the edge fasteners 10 cannot be used because the edge fasteners 10 extend above the surface of the grating and this would create a hazardous tripping situation. Instead the plate fasteners 20, 30 or 40 are used to install the grating panels by placing the plate fasteners 20, 30 or 40 along the longitudinal sides of the grating panels. When properly tightened, the plate fasteners 20, 30 or 40 provide the vertical support necessary to resist vertical wave pressures, while providing some lateral support in order to resist horizontal wave pressures. The edge fasteners 10 provide the necessary support in both lateral and horizontal directions.

The foregoing disclosure and description of the invention is illustrative and explanatory thereof, and various changes in the size, shape and materials, as well as in the details of the illustrated operation and construction may be made without departing from the spirit of the invention. For example, while the grating G is described as a series of spaced longitudinal and transversely extending bars, the grating may take other forms so long as the grating has openings to receive the gripping claws 202.

What is claimed is:

[1. An apparatus for securing a grating sheet comprised of parallel and transverse bars forming a pattern of openings to a structural member, the apparatus comprising:

an elongated generally L-shaped connector having an upper plate section generally rectangular in shape for mounting on an upper surface of the grating sheet;

a downwardly extending sidewall formed integrally with the plate section and adapted to extend along a longitudinal edge of the grating sheet; and attachment means for securing the sidewall to the structural member, wherein said apparatus is formed of corrosion resistant material and is able to withstand the forces of waves in a wave-zone portion of an offshore platform.]

[2. The apparatus of claim 1, wherein the plate section includes a downwardly extending series of teeth formed integrally with the plate section and extending parallel to the sidewall for insertion in said openings between the bars of the grating sheet.]

[3. The apparatus of claim 1, wherein said corrosion resistant material is stainless steel.]

[4. The apparatus of claim 1, wherein said corrosion resistant material is fiberglass.]

[5. An apparatus for securing a fiberglass grating sheet, comprised of parallel and transverse bars forming a pattern of openings, to a support member, the apparatus comprising:

an elongated generally L-shaped connector member for attachment to the grating sheet and to the support member, the connector member including an upper plate section generally rectangular in shape for mounting on an upper surface of the grating sheet;

a downwardly extending sidewall integral with the plate section and adapted to extend along a longitudinal edge of the grating sheet, wherein the sidewall and the plate section form a bracket for securing the grating sheet;

a plurality of downwardly extending teeth formed integrally with the plate section and spaced from each other for insertion between the grating bars; and securing means for securing said sidewall to said support member, wherein said apparatus is formed of corrosion resistant material and is able to withstand the forces of waves in a wave-zone portion of an offshore platform.]

[6. The apparatus of claim 5, wherein said corrosion resistant material is stainless steel.]

7. An apparatus for securing a grating sheet to structural members *in a wave zone of an offshore platform*, the grating sheet including an upper and lower surface, the apparatus comprising:

a top plate for mounting on the upper surface of the grating sheet, the top plate having a hole therein and upper and lower surfaces;

a bottom plate having a*n* [slot] opening, the bottom plate being [sized and shaped for attaching] *attached* to the structural member in a laterally extending direction for supporting the grating sheet; and

[engaging means] *a securing mechanism extending between the upper surface of the top plate and the bottom plate through the opening of the bottom plate* for clamping the top plate and bottom plate together

*with the grating sheet, the securing mechanism configured to be secured only from a position on a top surface of the grating sheet* in order to secure the grating sheet to the structural members so as to prevent displacement of the grating sheet from the structural members by extreme wave action, *the grating sheet being attached to structural members in a wave zone area of an offshore platform;* wherein said apparatus is formed of corrosion resistant material and [is able] *said apparatus is configured* to withstand the forces of waves in [a] *the* wave-zone portion of [an] *the* offshore platform area.

8. The apparatus of claim 7, wherein the [engaging means] *securing mechanism* is a bolt member shaped and sized for extending through the hole in the top plate and the [slot] opening in the bottom plate for engagement with a threaded nut, the bolt member including a threaded portion for mating with the threaded nut.

9. The apparatus of claim 7, wherein the bottom plate has upper and lower surfaces with a channel secured to the lower surface of the bottom plate and aligned with the [slot] opening of the bottom plate.

10. The apparatus of claim 9, wherein the channel is sized and shaped for housing a movable engaging means.

11. The apparatus of claim 10, wherein the movable engaging means is a threaded nut that mates with a threaded portion of a bolt member.

12. The apparatus of claim 7, further comprising a cylindrical standoff secured to the lower surface of the top plate for placement between adjacent grating bars, the standoff having a bore and an opening sized and shaped to receive a portion of a bolt member therethrough.

13. The apparatus of claim 7, wherein said corrosion resistant material is stainless steel.

[14. The apparatus of claim 7, wherein said grating sheet is a plurality of grating sheets used to form a floor for a walkway of an offshore platform and the structural members provide support for the walkway.]

[15. A fastening system for securing grating sheets having longitudinal edges comprised of parallel and transverse bars forming a pattern of openings to structural members of an offshore platform or other similar platform, comprising:

elongated generally L-shaped connectors for fastening the longitudinal edges of grating sheets to structural members in a wave zone area of the platform;

plate fasteners including a top plate for mounting on an upper surface of the grating sheets, a bottom plate for attaching to the structural members in a laterally extending direction for supporting the grating sheets and engaging means for clamping the top and bottom plates together in order to secure the grating sheets to the structural members in a wave zone area of the platform;

whereby the elongated L-shaped connectors together with the plate fasteners provide fastening support for the grating sheets so as to resist vertical and horizontal wave pressures when secured to the supporting members, wherein said system is formed of corrosion resistant material and is able to withstand the forces of waves in a wave-zone portion of an offshore platform.]

[16. The system of claim 15, wherein said corrosion resistant material is fiberglass.]

[17. The system of claim 15, wherein said corrosion resistant material is stainless steel.]

*18. An apparatus for securing a grating sheet comprised of parallel and transverse bars forming a pattern of openings to structural members of an offshore platform or other similar platform, comprising:*

*a top plate for mounting on the upper surface of the grating sheet of an offshore platform, the top plate having an opening therein;*

*a bottom plate being attached to the structural support members of an offshore platform in a laterally extending direction for supporting the grating sheet on the structural support members; and a threaded member extending between the top and bottom plates and through the opening in the top plate for engagement with a threaded nut for attaching the top and bottom plates together with the grating sheet, the threaded member configured to be secured only from a top surface of the grating sheet of the platform in order to secure the grating sheets to the structural members in a wave zone area of the platform;*

*wherein said apparatus is formed of corrosion resistant material and said apparatus is configured to withstand the forces of waves in the wave-zone portion of an offshore platform area.*

*19. The apparatus of claim 18, wherein the top and bottom plates are combined with elongated L-shaped connectors for providing fastening support for the grating sheets so as to resist vertical and horizontal wave pressures when secured to the supporting members.*

*20. The apparatus of claim 18, wherein the corrosion resistant material of the grating sheets is fiberglass.*

*21. The apparatus of claim 18, wherein the corrosion resistant material is stainless steel.*

* * * * *